United States Patent Office 3,141,820
Patented July 21, 1964

3,141,820
COCCIDIOSIS CONTROL COMPOSITION
Robert L. Clark, Woodbridge, and Edward F. Rogers, Middletown, N.J., assignors to Merck & Co., Inc., Rahway, N.J., a corporation of New Jersey
No Drawing. Original application Oct. 31, 1960, Ser. No. 65,924, now Patent No. 3,060,183, dated Oct. 23, 1962. Divided and this application Jan. 16, 1962, Ser. No. 166,702
8 Claims. (Cl. 167—53.1)

This invention relates generally to new chemical compounds and to methods of preparing them. It relates further to new compounds which are useful in treating and preventing the poultry disease coccidiosis. More particularly, it is concerned with novel piperazine compounds. Still more specifically, it relates to 1-(pyrimidinylmethyl)-piperazines, to acid addition salts of such compounds and to methods of preparing them. It relates in addition to animal feed compositions containing such compounds.

This application is a division of our co-pending application, Serial No. 65,924, filed October 31, 1960, now U.S. Patent No. 3,060,183.

Coccidiosis is a common and widespread poultry disease caused by several species of protozoan parasites of the genus Eimeria, such as *E. tenella, E. necatrix, E. acervulina, E. maxima, E. hagani* and *E. brunetti. E. tenella* is the caustative agent of a severe and often fatal infection of the ceca of chickens which is manifested by extensive hemorrhage, accumulation of blood in the ceca, and the passage of blood in the droppings. *E. necatrix* as well as certain other species attack the small intestine of the chick causing what is known as intestinal coccidiosis. Related species of coccidia such as *E. melagridis* and *E. adenoides* are causative organisms of coccidiosis in turkeys. When left untreated, the severe forms of coccidiosis lead to poor weight gain, reduced feed efficiency and high mortality in fowl. The elimination or control of coccidiosis is, therefore, of paramount importance in the poultry raising industry.

It has now been discovered that certain 1-(pyrimidinylmethyl)-piperazines and their acid addition salts possess a high degree of activity against protozoa which cause coccidiosis. It is one object of the present invention to provide such compounds. An additional object is provision of a method of synthesizing such piperazines. A still further object is the provision of compositions which are useful in the treatment or prevention of coccidiosis and which contain our novel piperazines as an active ingredient. Further objects will become evident from the ensuing detailed description of the invention.

The class of compounds encompassed by the present invention are 1-(4-amino-2-loweralkyl-5-pyrimidinylmethyl)-piperazines wherein the piperazine ring may be further substituted with a lower alkyl or lower alkenyl radical, and acid addition salts of such piperazines. This class of compounds, which may be represented by Formula I below, has a generally high level of anticoccidial activity.

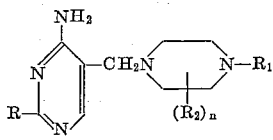

I

In the above structural formula, R and $R_2$ are lower alkyl radicals, $R_1$ is hydrogen, lower alkyl or lower alkenyl, and $n$ is a whole integer having a value of 0–2 inclusive. It is preferred that the lower alkyl groups represented by R, $R_1$ and $R_2$ contain from 1–3 carbon atoms, e.g., methyl, ethyl and propyl radicals, although other lower alkyl groups such as butyl and amyl may be employed if desired. Those substances in which the alkyl radical in the 2-position of the pyrimidine ring, i.e., R, has 2 or 3 carbon atoms appear to be the most satisfactory for preventing coccidiosis. $R_1$ in our compounds may be hydrogen, or it may be a lower alkyl or lower alkenyl radical of the type represented by methyl, ethyl, propyl, allyl and isopropyl. Although the preferred compounds of the invention are those wherein $n$ is 0, substances of Formula I having 1 or 2 lower alkyl groups attached to the carbon atoms of the piperazine ring are within the purview of the invention.

The 1-(4-amino-2-loweralkyl-5-pyrimidinylmethyl)-piperazines of this invention readily form acid addition salts which may contain up to 3 moles of acid per mole of piperazine. Although the invention is not limited to particular acid addition salts, for the purpose of treating coccidiosis it is preferred to employ a non-toxic salt, examples of which are mineral acid salts such as the hydrochloride, hydrobromide, sulfate and phosphate salts and salts of organic acids such as citrate, tartrate and naphthalene disulfonate salts. Although the tri-acid salt is formed when an excess of acid is used, those skilled in this art will realize that mixtures of mono-, di- and tri-acid salts are obtained when a theoretical deficiency of acid is present.

The compounds of the invention are prepared by intimately contacting an appropriate piperazine with a 4-amino-2-loweralkyl-5-hydroxymethyl pyrimidine ester of a strong inorganic acid, such as a hydrohalic acid. As the pyrimidine reactant a 4-amino-2-loweralkyl-5-halomethyl pyrimidine is preferred. Such halomethyl pyrimidines are normally produced synthetically in the form of their di-acid addition salts and it is convenient to use such salts as starting materials. For this reason, we prefer to employ an inorganic base or an excess of piperazine to neutralize the excess acid. The novel compounds of the invention are produced by the reaction of equimolar amounts of the piperazine and pyrimidine reactants so that excess piperazine or inorganic base is not necessary if the 4-amino-2-loweralkyl-5-halomethyl pyrimidine is utilized in the form of its free base.

The reaction is conveniently conducted in an inert solvent medium. An excess of the liquid piperazine may be used as the reaction medium if desired. It proceeds satisfactorily at room temperature, although higher or lower temperatures could be employed without affecting the process adversely. Since one mole of hydrogen bromide is formed as a reaction product, an acid addition salt forms unless an excess of piperazine or an inorganic base such as sodium or potassium carbonate is present to neutralize this acid. The resulting 1-(4-amino-2-loweralkyl-5-pyrimidinylmethyl)-piperazine is conveniently recovered by quenching the reaction mixture in water and extracting the pyrimidinylmethyl piperazine into an organic solvent such as chloroform, benezene or ether. It has been found that the free bases are more easily purified than the acid addition salts and it is, therefore, a preferred embodiment of the process to make the mixture strongly alkaline after the reaction is completed and to recover the 1-substituted piperazines in the form of the free base. They may be conveniently converted to any desired acid addition salt by treating with an excess of the appropriate acid in a suitable solvent such as methanol, ethanol or ether.

According to a second aspect of the invention, the 1-(4-amino-2-loweralkyl-5-pyrimidinylmethyl)-4-lower alkyl (or 4-lower alkenyl) piperazines described herein may be obtained by first reacting piperazine with 4-amino-2-loweralkyl-5-halomethyl pyrimidine to form 1-(4-amino-2-loweralkyl-5-pyrimidinylmethyl)-piperazine, and treating this material with an alkylating agent such as a lower alkyl or lower alkenyl halide.

When used for the prevention of coccidiosis, the compounds of the invention are normally fed to poultry as a component of the feed of the animals although they may also be given dissolved or suspended in the drinking water. According to one aspect of the invention, novel compositions are provided in which a 1-(4-amino-2-loweralkyl-5-pyrimidinylmethyl)-piperazine of Formula I above, or an acid addition salt thereof, is present as an active anticoccidial ingredient. Such compositions comprise the piperazine compound intimately dispersed in or admixed with an inert carrier or diluent, i.e., a diluent that is non-reactive with the piperazine and may be administered with safety to the animals. The carrier or diluent is preferably one that is or may be an ingredient of the animal feed.

The compositions which are a preferred feature of the invention are the so-called feed supplements in which the active ingredient is present in relatively large amounts and which are suitable for addition to the poultry feed either directly or after an intermediate dilution or blending step. Examples of carriers or diluents suitable for such compositions are solid orally ingestible carriers such as distillers' dried grain, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The piperazines are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 1% to about 40% by weight, and preferably from about 2–25% by weight of active ingredient are particularly suitable for addition to poultry feeds. The active compound is normally dispersed or mixed uniformly in the diluent but in some instances may be sorbed on the carrier. Examples of typical feed supplements containing a 1-(4-amino-2-loweralkyl-5-pyrimidinylmethyl)-piperazine in a solid inert carrier are:

|  | Lbs. |
|---|---|
| A. 1 - (4 - amino - 2 - ethyl - 5 - pyrimidinylmethyl)-4-ethyl piperazine | 5.0 |
| Wheat standard middlings | 95.0 |
| B. 1 - (4 - amino - 2 - propyl - 5 - pyrimidinylmethyl)-4-methyl piperazine | 10.0 |
| Corn distillers' dried grains | 90.0 |
| C. 1 - (4 - amino - 2 - ethyl - 5 - pyrimidinylmethyl)-4-propyl piperazine | 35.0 |
| Molasses solubles | 65.0 |
| D. 1 - (4 - amino - 2 - n - propyl - 5 - pyrimidinylmethyl)-piperazine trihydrochloride | 20.0 |
| Corn germ meal | 30.0 |
| Corn distillers' grains | 50.0 |

These and similar feed supplements are prepared by uniformly mixing the active compound with the carrier or carriers.

Such feed supplements are usually further diluted with materials such as corn meal or soybean meal before being incorporated in the animal feed. In this intermediate processing step the level of coccidostat in the carrier is brought down to form about 0.1% to about 1.0% by weight. This dilution serves to facilitate uniform distribution of the substance in the finished feed. The finished feed is one that contains a source of fat, protein, carbohydrate, minerals, vitamins and other nutritional factors.

The amount of 1-(4-amino-2-loweralkyl-5-pyrimidinylmethyl)-piperazine required for control of coccidiosis in poultry will, of course, vary somewhat with the specific compound or compounds employed. The compounds of Formula I above generally are effective in preventing the disease when administered at levels of less than about 0.05% by weight of the feed. With the preferred compounds of the invention, i.e. those wherein R in Formula I is ethyl or propyl, $R_1$ is lower alkyl and $n=0$, good results are obtained when from about 0.0005% to about 0.05% by weight of the total feed consumed is administered; for most satisfactory results it is preferred that the poultry feed contain between about 0.003% and 0.025% by weight of piperazine compound. The compounds may also be dissolved or suspended in the drinking water of the poultry and administered by this route.

The following examples are given for the purposes of illustration and not by way of limitation:

EXAMPLE 1

*1-(4-Amino-2-Methyl-5-Pyrimidinylmethyl)-4-Methyl Piperazine*

20 g. of 4-amino-2-methyl-5-bromomethyl pyrimidine dihydrobromide is added to 50 ml. of N-methyl piperazine in a reaction flask. A vigorous reaction occurs and the mixture is stirred and warmed to dissolve any solids. It is then heated on a steam bath for 3 hours and cooled to room temperature. The precipitate of N-methyl piperazine hydrobromide is removed by filtration and the filtrate concentrated in vacuo to near dryness. The residue thus obtained is dissolved in 5 ml. of warm ethanol, 175 ml. of ether added to the solution and the resulting small precipitate of N-methyl piperazine hydrobromide removed by filtration. The filtrate is again concentrated substantially to dryness in vacuo and the residue dissolved in a small volume of ether. An equal volume of 3 N-ethanolic hydrogen chloride is added to the ethereal solution whereupon a gummy solid separates which is crystallized, after decantation of the solvents, by warming with a small amount of ethanol. The crystals of 1-(4-amino-2-methyl-5-pyrimidinylmethyl)-4-methyl piperazine trihydrochloride thus obtained are recovered by filtration. On recrystallization from methanol-ether the product melts at 212–216° C.

EXAMPLE 2

*1-(4-Amino-2-Ethyl-5-Pyrimidinylmethyl)-Piperazine*

A. 35 g. of 4-amino-2-ethyl-5 bromomethyl pyrimidine dihydrobromide is added to 50 g. of piperazine hexahydrate in 300 ml. of ethanol. The mixture is warmed for a few minutes until all the solids dissolve and then allowed to stand at room temperature for 18 hours. It is then chilled and any precipitate of piperazine hydrobromide removed by filtration. The filtrate is concentrated to a volume of about 100 ml. and made strongly alkaline with 2.5 N aqueous sodium hydroxide solution. The alkaline solution is extracted with 300 ml. of chloroform and the chloroform extract separated and washed with 100 ml. of water. The chloroform solution is then evaporated to dryness to give a solid consisting of 1-(4-amino-2-ethyl-5-pyrimidinylmethyl)-piperazine, M.P. 167–169° C. after recrystallization from hot benzene.

B. 1 - (4 - amino-2-ethyl-5-pyrimidinylmethyl)-2,5-dimethyl piperazine is obtained by carrying out the procedure of Part A employing 23 g. of 2,5-dimethyl piperazine in place of the piperazine hexahydrate.

EXAMPLE 3

*1-(4-Amino-2-Ethyl-5-Pyrimidinylmethyl)-4-Ethyl Piperazine*

A mixture of 0.55 g. of 1-(4-amino-2-ethyl-5-pyrimidinylmethyl)-piperazine and 0.4 g. of ethyl iodide in 10 ml. of ethanol is refluxed for 2 hours. The ethanol is then removed by evaporation and the residue made strongly alkaline with dilute aqueous sodium hydroxide. This aqueous solution is extracted with an equal volume of ether and the ether extract concentrated to dryness in vacuo to give substantially pure 1-(4-amino-2-ethyl-5-pyrimidinylmethyl)-4-ethyl piperazine, M.P. 90° C,

EXAMPLE 4

1-(4-Amino-2-Ethyl-5-Pyrimidinylmethyl)-4-Methyl Piperazine

A solution of 9 g. of N-methyl piperazine and 10 ml. of acetonitrile is added to a suspension of 6.3 g. of 4-amino-2-ethyl-5-chloromethyl pyrimidine dihydrochloride in 50 ml. of acetonitrile. The reaction mixture is shaken vigorously for several minutes and then allowed to stand at room temperature for 18 hours. It is then diluted with 200 ml. of water. 25 ml. of concentrated ammonium hydroxide is then added and the resulting solution extracted with four 100-ml. portions of chloroform. The chloroform extracts are combined and acidified with dilute hydrochloric acid and the resulting acidic solution evaporated to dryness in vacuo. The residue thus obtained is crystallized from methanol-acetone to give substantially pure 1-(4-amino-2-ethyl-5-pyrimidinylmethyl)-4-methyl piperazine trihydrochloride, M.P. 250–253° C.

Similar results are obtained when the above procedure is carried out employing 10 g. of 4-amino-2-ethyl-5-bromomethyl pyrimidine dihydrobromide and 9 g. of N-methyl piperazine as the starting materials.

EXAMPLE 5

1-(4-Amino-2-n-Propyl-5-Pyrimidinylmethyl)-2,4-Dimethyl Piperazine

A mixture of 31 g. of 1-carbethoxy-3-methyl piperazine and 81 g. of lithium aluminum hydride in 3 l. of ether is refluxed for 12 hours. At the end of this time, 350 ml. of water is added. The ether is decanted and the aqueous layer containing the large amount of solid washed with additional portions of fresh ether. The ether solutions are then combined and the ether evaporated. The residue is distilled to give substantially pure 1,3-dimethyl piperazine, B.P. 60–62° C./38 mm.

10 g. of 4-amino-2-n-propyl-5-bromomethyl pyrimidine dihydrobromide is added to 50 ml. of acetonitrile. To this solution is added 12 g. of 1,3-dimethyl piperazine. The reaction mixture is shaken to dissolve any solid material and then allowed to stand at room temperature for 12 hours. It is then diluted with 200 ml. of water and 25 ml. of concentrated ammonium hydroxide. The solution is extracted with 4 x 100 ml. of chloroform and the chloroform removed in vacuo. The residue is dissolved in ether, the ether solution filtered and then concentrated to give crystals of 1-(4-amino-2-n-propyl-5-pyrimidinylmethyl)-2,4-dimethyl piperazine.

EXAMPLE 6

1-(4-Amino-2-Ethyl-5-Pyrimidinylmethyl)-4-Ethyl Piperazine 74 g. of N-ethyl piperazine is added to a stirred suspension of 125 g. of anhydrous sodium carbonate and 750 ml. of acetonitrile. To the resulting mixture 246 g. of 4-amino-2-ethyl-5-bromomethyl pyrimidine dihydrobromide is added over a period of one hour. The resulting mixture is stirred at room temperature for 18 hours and then 500 ml. of water added carefully. The resulting clear solution is concentrated in vacuo to remove the acetonitrile. The strongly alkaline residual solution is then extracted with four 250-ml. portions of chloroform. The chloroform extracts are combined and evaporated to dryness in vacuo. The residual solid thus obtained is dissolved in 500 ml. of ether and the ether solution treated with decolorizing charcoal. The charcoal is removed by filtration, the ether concentrated to a volume of about 200 ml. and treated with an equal volume of petroleum ether. Substantially pure 1-(4-amino-2-ethyl-5-pyrimidinylmethyl)-4-ethyl piperazine crystallizes, M.P. 90–91° C. after recrystallization from ether-petroleum ether.

The above process is employed for the synthesis of the 1-(4-amino-2-loweralkyl-5-pyrimidinylmethyl)4-loweralkyl piperazine described below, the reactions being carried out employing 3 molar equivalents of the piperazine reactant for each molar equivalent of the pyrimidine reactant:

(a) 4-amino-2-n-propyl-5-bromomethyl pyrimidine dihydrobromide reacted with N-methyl piperazine yields 1-(4-amino-2-n-propyl-5-pyrimidinylmethyl)-4-methyl piperazine, M.P. 126° C. on recrystallization from chloroform-petroleum ether.

(b) 4-amino-2-n-propyl-5-chloromethyl pyrimidine dihydrochloride reacted with N-ethyl piperazine yields 1-(4-amino-2-n-propyl-5-pyrimidinylmethyl)-4-ethyl piperazine, M.P. 126° C. on recrystallization from ether-petroleum ether.

(c) 4-amino-2-ethyl-5-chloromethyl pyrimidine dihydrochloride reacted with N-isopropyl piperazine yields 1-(4-amino-2-ethyl-5-pyrimidinylmethyl)-4-isopropyl piperazine, M.P. 82–84° C. on recrystallization from ether-petroleum ether.

(d) 4-amino-2-ethyl-5-chloromethyl pyrimidine dihydrochloride reacted with N-n-propyl piperazine yields 1-(4-amino-2-ethyl-5-pyrimidinylmethyl)-4-n-propyl piperazine, M.P. 85–86° C. on recrystallization from ether-petroleum ether.

EXAMPLE 7

1-(4-Amino-2-Ethyl-5-Pyrimidinylmethyl)-4-Allyl Piperazine

To a solution of 22 g. of 1-(4-amino-2-ethyl-5-pyrimidinylmethyl)-piperazine in 100 ml. of 95% ethanol is added 10 ml. of 3-chloropropene and 10 g. of sodium bicarbonate. The mixture is warmed to 50° C. and then allowed to stand at room temperature for 18 hours. 10 ml. of water is then added and the mixture heated at 60–70° C. for one hour. The alcohol is then evaporated, 50 ml. of water added and the product extracted with 500 ml. of benzene. The benzene solution is dried over sodium sulfate, filtered and evaporated to dryness in vacuo to give a residue of 1-(4-amino-2-ethyl-5-pyrimidinylmethyl)-4-allyl piperazine, M.P. 85° C. This is soluble in cold water. On recrystallization from benzene-petroleum ether the product melts at 91–92° C.

In a similar manner 3-chloro-2-methylpropene is reacted with 1-(4-amino-2-ethyl-5-pyrimidinylmethyl)-piperazine to give 1-(4-amino-2-ethyl-5-pyrimidinylmethyl)-4-methallyl piperazine.

Any departure from the above description which conforms to the present invention is intended to be included within the scope of the claims.

What is claimed is:

1. A poultry feed having dispersed therein a compound of the formula

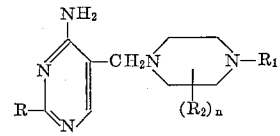

wherein R and $R_2$ are lower alkyl groups, $R_1$ is selected from the class consisting of hydrogen, lower alkyl and lower alkenyl and $n$ has a value of 0–2 inclusive, and acid addition salts thereof.

2. A poultry feed supplement composition that comprises an edible inert carrier having dispersed therein from about 1% to about 40% by weight of a compound of the formula

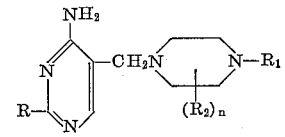

wherein R and $R_2$ are lower alkyl groups, $R_1$ is selected from the class consisting of hydrogen, lower alkyl and lower alkenyl and $n$ has a value of 0–2 inclusive, and acid addition salts thereof.

3. A poultry feed having dispersed therein from about 0.0005% to about 0.05% by weight of 1-(4-amino-2-loweralkyl-5-pyrimidinylmethyl)-4-loweralkyl piperazine.

4. A poultry feed having dispersed therein from about 0.0005% to about 0.05% by weight of a non-toxic acid addition salt of 1-(4-amino-2-loweralkyl-5-pyrimidinylmethyl)-4-loweralkyl piperazine.

5. A poultry feed having dispersed therein from about 0.0005% to about 0.05% by weight of 1-(4-amino-2-ethyl-5-pyrimidinylmethyl)-4-ethyl piperazine.

6. A poultry feed supplement composition that comprises an edible, inert carrier having dispersed therein from about 1% to about 40% by weight of 1-(4-amino-2-loweralkyl-5-pyrimidinylmethyl)-4-loweralkyl piperazine.

7. A poultry feed supplement composition that comprises an edible, inert carrier having dispersed therein from about 1% to about 40% by weight of a non-toxic acid addition salt of 1-(4-amino-2-loweralkyl-5-pyrimidinylmethyl)-4-loweralkyl piperazine.

8. A poultry feed supplement composition that comprises an edible, inert carrier having dispersed therein from about 1% to about 40% by weight of 1-(4-amino-2-ethyl-5-pyrimidinylmethyl)-4-ethyl piperazine.

No references cited.